United States Patent
Kulkarni et al.

(10) Patent No.: US 8,347,389 B2
(45) Date of Patent: Jan. 1, 2013

(54) SYSTEM FOR PROTECTING DEVICES AGAINST VIRUS ATTACKS

(75) Inventors: Abhijit P. Kulkarni, Pune (IN); Prakash D. Jagdale, Pune (IN)

(73) Assignee: Quick Heal Technologies (P) Ltd., Pune, Maharashtra (IN)

( * ) Notice: Subject to any disclaimer, the term of this patent is extended or adjusted under 35 U.S.C. 154(b) by 486 days.

(21) Appl. No.: 12/633,073

(22) Filed: Dec. 8, 2009

(65) Prior Publication Data

US 2010/0146626 A1 Jun. 10, 2010

(30) Foreign Application Priority Data

Dec. 10, 2008 (IN) .......................... 2579/MUM/2008

(51) Int. Cl.
*G06F 11/00* (2006.01)
*H04L 9/32* (2006.01)

(52) U.S. Cl. ................ 726/24; 726/25; 726/26; 726/27; 713/187; 713/188

(58) Field of Classification Search ...................... 726/24
See application file for complete search history.

(56) References Cited

U.S. PATENT DOCUMENTS

| | | |
|---|---|---|
| 6,802,028 B1 | 10/2004 | Ruff et al. |
| 2003/0110391 A1* | 6/2003 | Wolff et al. ................... 713/200 |
| 2006/0265749 A1 | 11/2006 | Kwon et al. |
| 2009/0038011 A1 | 2/2009 | Nadathur |
| 2009/0049550 A1* | 2/2009 | Shevchenko ................... 726/23 |

* cited by examiner

*Primary Examiner* — Longbit Chai
(74) *Attorney, Agent, or Firm* — Lucas & Mercanti LLP; Robert P. Michal

(57) ABSTRACT

A system for protecting devices operating on 64-bit editions of operating systems by retrieving the file path by which the process was run and not the actual file path from where the process is running and scanning this retrieved file path for viruses.

20 Claims, 2 Drawing Sheets

SYSTEM FOR PROTECTING DEVICES AGAINST VIRUS ATTACKS

CROSS-REFERENCE TO RELATED APPLICATION

Figure 1:
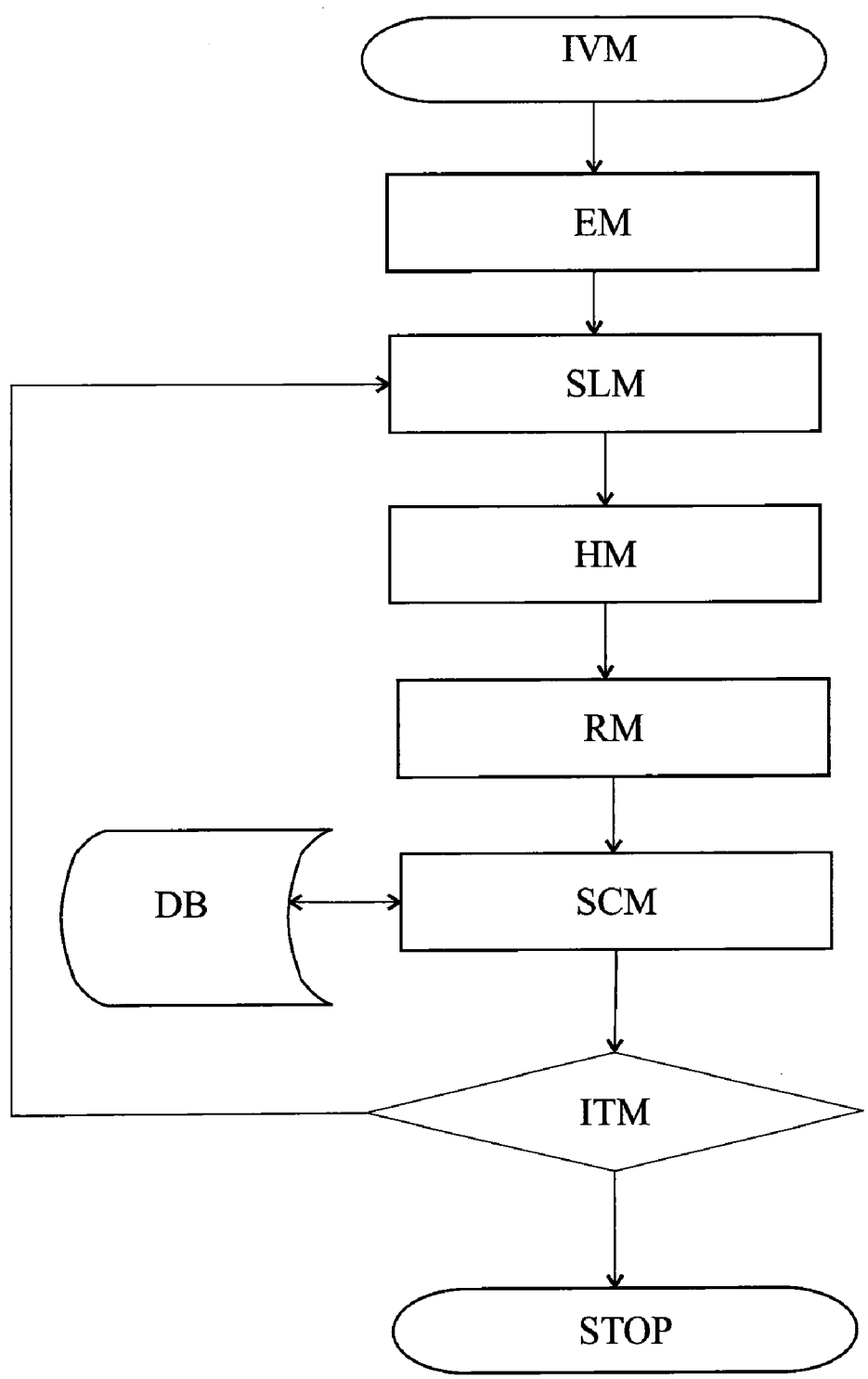

The present application claims priority under 35 USC 119 of Indian Patent Application 2579/MUM/2008 filed Dec. 10, 2008, the entire disclosure of which is incorporated herein by reference.

FIELD OF THE INVENTION

This invention relates to systems for protecting devices against virus attacks.

DEFINITIONS OF TERMS USED IN THE SPECIFICATION

The expression 'device' in this specification is used to refer to a computer system, a network system, a personal digital assistant (PDA) system, a mobile telephone system, or any hand held or fixed system which typically requires the use of an Operating System (OS) for its functions.

The expression 'handle' in this specification is used to refer to a particular kind of smart pointer. Handles are used when an application references blocks of memory or objects managed by another system, such as a database or an operating system.

The expression 'MS DOS path format' in this specification refers to a user friendly file path format which is typically used by applications. The MS DOS path format uses the drive letters assigned to a device name in its path format, for instance c:\windows\syswow64\target.exe is the equivalent MS DOS path format for \device\harddiskvolume1\windows\syswow64\target.exe.

The expression 'NT device path format' in this specification refers to an internal file path assigned by the operating system to enable access to a file. When a device driver is loaded, its initialization routine registers a device name with the operating system's 'object manager'. This name is referred to as the NT device name. These names have a format such as \device\harddiskvolume1. The 'NT device path format' is the file path which uses the internally assigned device names to enable access to a file. For instance, \device\harddiskvolume1\windows\syswow64\target.exe is the NT device path format for the file target.exe.

The expression 'scan' in this specification is used to refer to an examination of processes/files/registry/systems for virus attacks.

The expression 'virus' in this specification is used to refer to a program or a programming code that replicates by being copied or initiating its copying to another program, computer boot sector or document. Viruses can be transmitted as attachments to an e-mail note or in a downloaded file, or be present on a diskette or CD. Some viruses wreak their effect as soon as their code is executed; other viruses lie dormant until circumstances cause their code to be executed by the computer. The expression 'virus' in this specification includes computer viruses, worms, Trojan horses, backdoors, most rootkits, spywares, dishonest adwares, crimewares and other malicious and unwanted softwares which are now collectively know as 'malware'.

The expression 'virus signature database' in this specification is a definition file or a DAT file having a list of characteristic byte-patterns that uniquely identify a specific virus or family of viruses. If a virus scanner finds such a pattern in a process/file, it notifies the user that the file is infected.

BACKGROUND OF THE INVENTION AND PRIOR ART

Typically, a computer system which is basically hardware is only functional after it is tied up with an operating system. One such widely used operating system is the Microsoft developed Windows system.

A 64-bit version of Windows system is one wherein all the core components and peripheral components are adapted to transmit, receive and work on 64-bit data. This version allows execution of 32-bit application. This is achieved by using a subsystem which executes the application viz., WOW64 which stands for Windows on Windows 64-bit. More appropriately, it can be put as 32-bit Windows subsystem on 64-bit Windows.

Dynamic-link library (DLL) is an implementation of the shared library concept in the Microsoft Windows and OS/2 operating systems. A 32-bit process cannot load a 64-bit DLL and, similarly, a 64-bit process cannot load a 32-bit DLL. As the Windows system folder contains both the installed applications and their DLLs, it must be separated into a native system folder for the 64-bit applications (%windir%\system32) and a WOW64 folder for the 32-bit applications (%windir%\syswow64). Here %windir% is the Windows folder or more specifically Windows installation folder.

Developers often hard code the system folder path name in their application. Therefore, to preserve application compatibility, the 64-bit system folder is still called system32. To enable 32-bit applications that have hard-coded paths to transparently access the WOW64 system directory, the WOW64 layer provides a File System Redirector feature which redirects the 32-bit application's attempts to access (%windir%\system32) to the new WOW64 system directory (%windir%\syswow64).

A device may get infected by a virus through many sources including:

Floppy/CD/DVD drives: The virus, typically, spreads through boot sector of these drives.

Pen drives: The virus spreads through autorun feature of this drive.

Network: The virus spreads through network shares.

Internet: The virus spreads when infected websites are browsed.

A memory scanner should detect virus which may have spread through any of the above mentioned media or scenario.

All accesses made by a WOW64 (32-bit) process to the %windir%\system32 directory are redirected to the %windir%\syswow64 directory. Therefore, with file system redirection enabled, a 32-bit application accesses the same contents for both the system32 and syswow64 directories. File system redirection is enabled for all WOW64 applications by default.

A windows system includes a core loading means (folder) which includes applications and processes that run on 32-bit operating systems.

Assuming c:\windows is the Windows folder, Launch.exe is a 32-bit application that will launch the target.exe. Target.exe which can be 32-bit or 64-bit application will be launched from c:\windows\syswow64\. Launch.exe launches target.exe by using the path c:\windows\system32\target.exe. Since launch.exe is a 32-bit application it will run under WOW64 and the path c:\windows\system32\target.exe will get redirected to c:\windows\syswow64\target.exe and the target.exe will run.

Typically, an Anti-Virus system having memory scanning function has a memory scanning means comprising:

enumerating means adapted to enumerate running processes;

defining means adapted to define the file path of the enumerated running processes; and scanning means adapted to scan file obtained at the defined path.

The main issue in the Anti-virus systems of the prior art deals with the defining means (typically, GetModuleFileNameEx in Windows system). The defining means gets the file path of the running processes, by which the process was run and not the actual file path from where the process is running. Hence, in the above example, it fetches the file path c:\windows\system32\target.exe (the file path which was used to run the process) instead of c:\windows\syswow64\target.exe (the actual file path from where the file is running).

Therefore, the 64-bit memory scanning means will scan c:\windows\system32\target.exe instead of c:\windows\syswow64\target.exe and hence skip the actual file. If target.exe is a virus file, then that won't be detected by the memory scanner means. This problem doesn't occur with 32-bit memory scanner means because when it tries to scan c:\windows\system32\target.exe it is automatically redirected to c:\windows\syswow64\target.exe thereby scanning the actual file.

A detailed flow of events in an Anti-Virus system of the prior art is illustrated in FIG. 1 and described herein below.

In accordance with a system of the prior art, an Anti-Virus system comprises:

an invoking means IVM that invokes a memory scan feature using a user interface;

an enumerating means EM that enumerates all running processes and the result of the enumeration is returned in the form of a list of the Process Identifiers or ProcessIds;

a selection means SLM that selects a ProcessId from the list generated by the enumeration means EM;

a handling means HM that provides a handle for opening the selected process;

a retrieving means RM that retrieves and defines the file path of the selected process in MS DOS path format;

a scanning means SCM that scans the file obtained at the defined path using the virus database which stores a plurality of virus signatures;

an iteration means ITM that continues the steps starting from selecting a ProcessId from the list generated by the enumeration means EM upto scanning until each and every ProcessId has been selected at least once.

The retrieving means RM used in the Anti-virus systems known in the art use the GetModuleFileNameEx function for retrieving the file path. Thus the file path retrieved is the file path that is used to run the process and not the actual file path of the running process.

Several attempts have been made to make the Anti-virus systems known in the art more efficient. For instance, U.S. Pat. No. 6,802,028 discloses an interface that provides a first access path to the storage medium and a detector that provides a second access path to the storage medium and an analyzing step that detects a virus by identifying an inconsistency between storage locations accessed using the two paths and removing means to remove the virus from the computer system.

Furthermore, US Patent Application 2006/0265749 discloses a method to scan and remove viruses present in thread areas. It searches a list of threads, associated with the infected process and scanning and disinfecting the searched file wherein scanning of infection and the disinfection procedure is carried out for thread areas of the memory.

Again, US Patent Application 2009/0038011 discloses a method which comprises the steps of storing the executable file with the stored information, determining via the detection module whether there is any difference between the executable file and the stored information and replacing the removal executable file with the copy of the malware free executable file.

Although attempts including those mentioned herein above have improved the working of Anti-Virus systems, there is still a need for a system that can provide accurate protection for systems with 64-bit editions of operating systems.

OBJECTS OF THE INVENTION

One object of the invention is to provide a reliable system for protecting devices against virus attacks.

Another object of the invention is to provide a system for protecting devices operating on 64-bit operating systems against virus attacks.

Yet another object of the invention is to provide an efficient system for protecting devices against virus attacks.

SUMMARY OF THE INVENTION

In accordance with an embodiment of the present invention, there is provided a system for protecting devices against virus attacks, the devices comprising a 64-bit operating system and a virus signature database, the system comprising:

an invoking means adapted to be accessed by a user interface and invoke the system in the device to be scanned;

an enumerating means adapted to enumerate a plurality of running processes in the device to be scanned and generate an output comprising a list of Process Identifiers associated with the plurality of running processes;

a selection means adapted to select one of the Process Identifiers associated with one of the running processes;

a handle providing means adapted to provide a handle for opening the selected process;

a retrieving means adapted to retrieve and define an actual file path from the handle of the selected process;

a conversion means adapted to convert the retrieved and defined file path from a first pre-defined format to a second pre-defined format;

a scanning means adapted to receive the file path in the second pre-defined format and scan the selected process associated with the file path using the virus signature database; and an iteration means adapted to invoke the selection means until each of the plurality of running processes are scanned.

Typically, in accordance with this invention, the first pre-defined format of the file path is a NT device path format.

Typically, in accordance with this invention, the second pre-defined format of the file path is an MS DOS path format.

Typically, in accordance with this invention, the retrieving means is GetProcessImageFileName.

In accordance with an embodiment of the present invention, there is provided a method for providing a system for protecting devices against virus attacks, the devices including a 64-bit operating system and a virus signature database, a plurality of processes and a plurality of user interfaces, the method comprising the following steps:

creating a list of at least one running process in the device to be scanned;
listing the Process Identifiers associated with each process in said list;
selecting one of the Process Identifiers associated with one of the running processes;
opening the selected processes using a handle;
retrieving and defining an actual file path from the handle of the selected process;
converting the retrieved and defined file path from a first pre-defined format to a second pre-defined format; and
receiving the file path in the second pre-defined format and scanning the selected process associated with the file path using the virus signature database.

Typically, in accordance with this invention, the step of selecting one of the Process Identifiers associated with one of the running processes is iterated until each of the plurality of Process Identifiers has been selected at least once.

Typically, in accordance with this invention, the step of retrieving and defining an actual file path includes using GetProcessImageFileName function.

Typically, in accordance with this invention, the step of converting the retrieved and defined file path includes converting the retrieved and defined file path from a NT device path format to a MS DOS path format.

Typically, in accordance with this invention, the step of receiving the file path includes receiving the file path in MS DOS path format.

In accordance with an alternate embodiment of the present invention, there is provided a system for protecting devices against virus attacks, the devices comprising a 64-bit operating system and a virus signature database, the system comprising:

an invoking means adapted to be accessed by a user interface and invoke the system in the device to be scanned;
an enumerating means adapted to enumerate a plurality of running processes in the device to be scanned and generate an output comprising a list of Process Identifiers associated with the plurality of running processes;
a selection means adapted to select one of the Process Identifiers associated with one of the running processes;
a handle providing means adapted to provide a handle for opening the selected process;
a retrieving means adapted to retrieve and define an actual file path from the handle of the selected process;
a scanning means adapted to receive the file path and scan the selected process associated with the file path using the virus signature database; and
an iteration means adapted to invoke the selection means until each of the plurality of running processes are scanned.

Typically, in accordance with an alternate embodiment of the present invention, the file path is in a MS DOS path format.

Typically, in accordance with an alternate embodiment of the present invention, the retrieving means is the GetMappedFileName function.

In accordance with an alternate embodiment of the present invention, there is provided a method for providing a system for protecting devices against virus attacks, the devices including a 64-bit operating system and a virus signature database, a plurality of processes and a plurality of user interfaces, the method comprising the following steps:

creating a list of at least one running process in the device to be scanned;
listing the Process Identifiers associated with each process in said list;
selecting one of the Process Identifiers associated with one of the running processes;
opening the selected processes using a handle;
retrieving and defining an actual file path from the handle of the selected process; and
receiving the file path and scanning the selected process associated with the file path using the virus signature database.

Typically, in accordance with an alternate embodiment of the present invention, the step of selecting one of the Process Identifiers associated with one of the running processes is iterated until each of the plurality of Process Identifiers has been selected at least once.

Typically, in accordance with an alternate embodiment of the present invention, the step of retrieving and defining an actual file path includes using the GetMappedFileName function.

Typically, in accordance with an alternate embodiment of the present invention, the step of receiving the file path includes receiving the file path in MS DOS path format.

In accordance with this invention, a 64-bit module running on 64-bit operating system is provided including retrieving means as described in the first embodiment herein above.

In accordance with this invention, a method of operation in a 64-bit module running on 64-bit operating system is provided including the step of retrieving and defining an actual file path as described in the first embodiment herein above.

In accordance with this invention, a 64-bit module running on 64-bit operating system is provided including said retrieving means as described in the alternate embodiment herein above.

In accordance with this invention, method of operation in a 64-bit module running on 64-bit operating system is provided including the step of retrieving and defining an actual file path as described in the alternate embodiment herein above.

BRIEF DESCRIPTION OF THE ACCOMPANYING DRAWINGS

Figure 2:
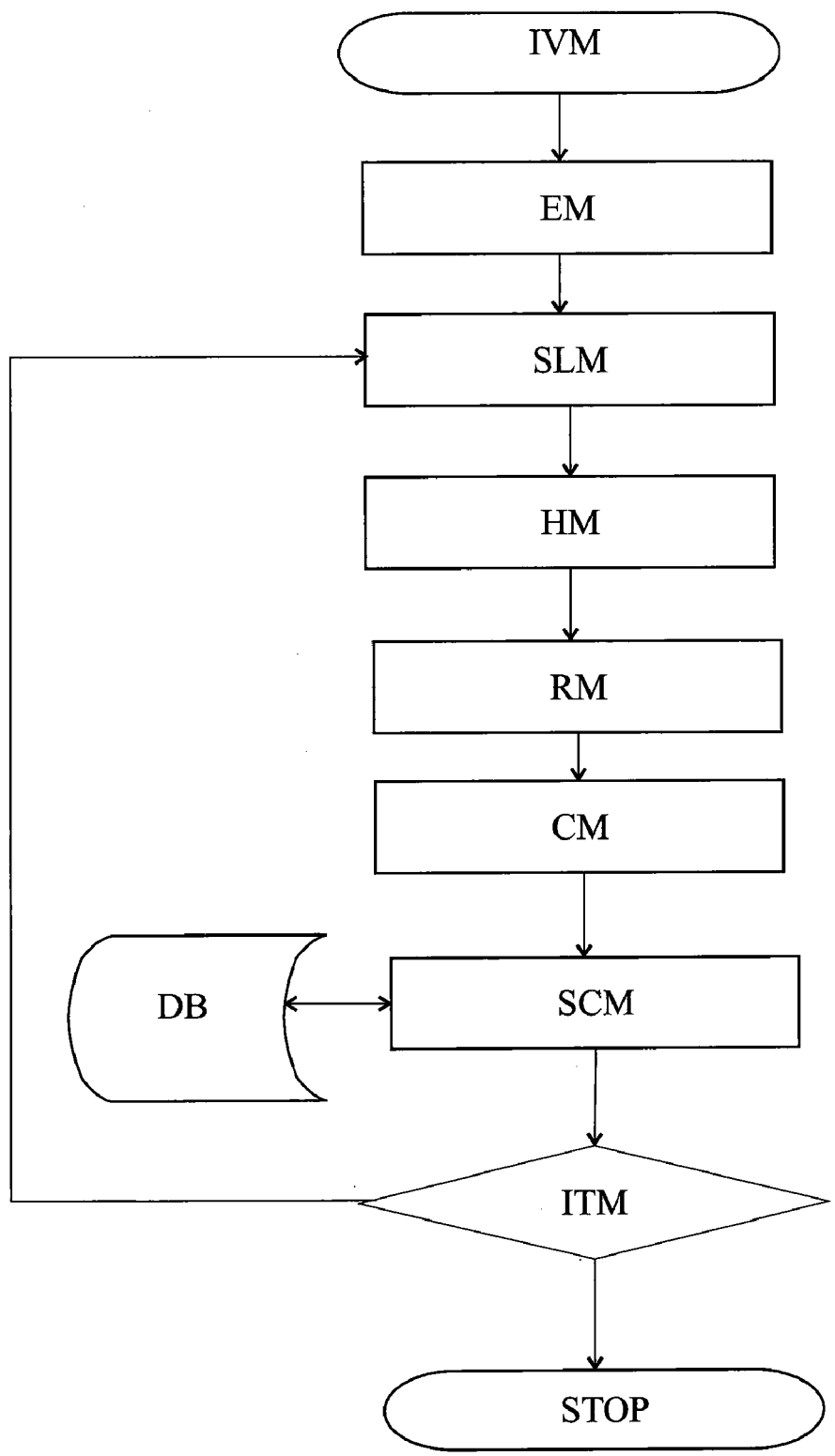

The invention will now be described in relation to the accompanying drawings, in which:

FIG. 1 illustrates a flow of events in an anti-virus system known in the art; and FIG. 2 illustrates a flow of events in the system for protecting devices in accordance with the present invention.

DETAILED DESCRIPTION OF THE ACCOMPANYING DRAWINGS

The invention will now be described with reference to the embodiment shown in the accompanying drawings. The embodiment does not limit the scope and ambit of the invention. The description relates purely to the exemplary preferred embodiment of the invention and its suggested application.

FIG. 1 illustrates a flow of events in an anti-virus system known in the art and described herein above. The main drawback of 64-bit Anti-Virus memory scanners known in the art was that a running virus could not be detected. This problem was predominant in Anti-Virus products which have their memory scanning components as 64-bit. This problem hence is generated on 64-bit editions of Operating systems like Microsoft Windows XP, Windows Server 2003 and the like.

FIG. 2 illustrates a flow of events in the system for protecting devices in accordance with the present invention and is described herein below.

In accordance with a system in accordance with the present invention, an Anti-Virus system comprises:
- an invoking means IVM that invokes a memory scan feature using a user interface;
- an enumerating means EM that enumerates all running processes and the result of the enumeration is returned in the form of a list of the Process Identifiers or ProcessIds;
- a selection means SLM that selects a ProcessId from the list generated by the enumeration means EM;
- a handling means HM that provides a handle for opening the selected process;
- a retrieving means RM that retrieves and defines the file path of the selected process in NT device path format;
- a conversion means CM that converts the retrieved NT device path format of the selected process to MS DOS path format;
- a scanning means SCM that scans the file using the file path in MS DOS path format using the virus signature database;
- an iteration means ITM that continues the steps starting from selecting a ProcessId from the list generated by the enumeration means EM upto scanning until each and every ProcessId has been selected at least once.

The retrieving means RM uses GetProcessImageFileName to retrieve the actual file path of the running process and not the file path that is used to run the process. Hence, the actual file for the running process is scanned, thereby rectifying the flaw of the prior art. The GetProcessImageFileName function retrieves the file path in NT device path format which is then converted to MS DOS path format for scanning purpose.

In accordance with an alternate embodiment of the present invention, an Anti-Virus system comprises:
- an invoking means IVM that invokes a memory scan feature using a user interface;
- an enumerating means EM that enumerates all running processes and the result of the enumeration is returned in the form of a list of the Process Identifiers or ProcessIds;
- a selection means SLM that selects a ProcessId from the list generated by the enumeration means EM;
- a handling means HM that provides a handle for opening the selected process;
- a retrieving means RM that retrieves and defines the file path of the selected process in MS DOS path format;
- a scanning means SCM that scans the file using the file path in MS DOS path format received from the retrieving means RM using the virus signature database; and
- an iteration means ITM that continues the steps starting from selecting a ProcessId from the list generated by the enumeration means EM upto scanning until each and every ProcessId has been selected at least once.

The retrieving means RM in the alternate embodiment of the present invention uses the GetMappedFileName function to retrieve the actual file path of the running process and not the file path that is used to run the process. Hence, the actual file for the running process is scanned, thereby rectifying the flaw of the prior art. The GetMappedFileName function retrieves the file path in MS DOS path format and hence there is no need for conversion.

The Anti-Virus system in accordance with the present invention is further explained as given below:

Assume c:\windows is the Windows folder. Launch.exe is a 32-bit application that will launch the target.exe. Target.exe which can be 32-bit or 64-bit application is present in c:\windows\syswow64\ and will be launched from this folder. Launch.exe launches target.exe by using the path c:\windows\system32\target.exe instead of directly using the path c:\windows\syswow64\target.exe. Since launch.exe is a 32-bit application it will run under WOW64 subsystem of Windows OS and the path c:\windows\system32\target.exe will get redirected to c:\windows\syswow64\target.exe and the target.exe will run.

In accordance with the first embodiment described herein above, the retrieving means retrieves and defines an actual file path in the NT device path format as \device\harddiskvolume1\windows\syswow64\target.exe (the actual file path from where the file is running). The conversion means will convert this file path to the MS DOS path format as c:\windows\syswow64\target.exe.

In accordance with the alternate embodiment described herein above, the retrieving means will fetch the actual file path in MS DOS path format as c:\windows\syswow64\target.exe.

Hence the memory scanner scans c:\windows\syswow64\target.exe which is the actual path. If target.exe is a virus file then it will be detected by the memory scanner.

Although the present invention described herein above is with reference to a computer system, the same can be extended to any device comprising an operating system.

The retrieving means in accordance with both embodiments of the present invention described herein above can be applied to a 64-bit module running on 64-bit operating system.

Technical Advancement

The system for protecting devices against virus attacks described in this invention has several technical advantages including but not limited to the realization of:
- a reliable system for protecting devices against virus attacks;
- an efficient system for retrieving the actual file path of the running process and not the file path that is used to run the process. Hence, the actual file for the running process is scanned; and
- a system for protecting devices operating on 64-bit operating systems against virus attacks.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

What is claimed is:

1. A system for protecting devices against virus attacks, the devices comprising a 64-bit operating system and a virus signature database, said system comprising:
- an invoking means adapted to be accessed by a user interface and invoke said system in the device to be scanned;
- an enumerating means adapted to enumerate a plurality of running processes in the device to be scanned and generate an output comprising a list of Process Identifiers associated with said plurality of running processes;
- a selection means adapted to select one of said Process Identifiers associated with one of said running processes;
- a handle providing means adapted to provide a handle for opening said selected process;
- a retrieving means adapted to retrieve and define an actual file path from said handle of said selected process, wherein the actual file path is defined as a file path from which a file is actually running instead of a file path which was originally used to run the process;

a conversion means adapted to convert said retrieved and defined file path from a first pre-defined format to a second pre-defined format;

a scanning means adapted to receive said file path in the second pre-defined format and scan the selected process associated with the file path using said virus signature database; and an iteration means adapted to invoke said selection means until each of said plurality of running processes are scanned.

2. The system for protecting devices as claimed in claim 1, wherein said first pre-defined format of said file path is a NT device path format.

3. The system for protecting devices as claimed in claim 1, wherein said second pre-defined format of said file path is an MS DOS path format.

4. The system for protecting devices as claimed in claim 1, wherein said retrieving means is the GetProcessImageFileName function.

5. A 64-bit module running on 64-bit operating system including said retrieving means as claimed in claim 4.

6. A method for protecting devices against virus attacks, the devices including a 64-bit operating system and a virus signature database, a plurality of processes and a plurality of user interfaces, said method comprising the following steps:
creating a list of at least one running process in the device to be scanned;
listing the Process Identifiers associated with each process in said list;
selecting one of said Process Identifiers associated with one of said running processes;
opening said selected processes using a handle;
retrieving and defining an actual file path from said handle of said selected process, wherein the actual file path is defined as a file path from which a file is actually running instead of a file path which was originally used to run the process;
converting said retrieved and defined file path from a first pre-defined format to a second pre-defined format; and
receiving said file path in said second pre-defined format and scanning said selected process associated with said file path using said virus signature database.

7. The method for providing a system for protecting devices as claimed in claim 6 wherein said step of selecting one of said Process Identifiers associated with one of said running processes is iterated until each of said plurality of Process Identifiers has been selected at least once.

8. The method for providing a system for protecting devices as claimed in claim 6 wherein said step of retrieving and defining an actual file path includes using the GetProcessImageFileName function.

9. A method of operation in a 64-bit module running on 64-bit operating system including the step of retrieving and defining an actual file path as claimed in claim 8.

10. The method for providing a system for protecting devices as claimed in claim 6 wherein said step of converting said retrieved and defined file path includes converting said retrieved and defined file path from a NT device path format to a MS DOS path format.

11. The method for providing a system for protecting devices as claimed in claim 6 wherein said step of receiving said file path includes receiving said file path in MS DOS path format.

12. A system for protecting devices against virus attacks, the devices comprising a 64-bit operating system and a virus signature database, said system comprising:

an invoking means adapted to be accessed by a user interface and invoke said system in the device to be scanned;

an enumerating means adapted to enumerate a plurality of running processes in the device to be scanned and generate an output comprising a list of Process Identifiers associated with said plurality of running processes;

a selection means adapted to select one of said Process Identifiers associated with one of said running processes;

a handle providing means adapted to provide a handle for opening said selected process;

a retrieving means adapted to retrieve and define an actual file path from said handle of said selected process, wherein the actual file path is defined as a file path from which a file is actually running instead of a file path which was originally used to run the process;

converting said retrieved and defined file path from a first pre-defined format to a second pre-defined format;

a scanning means adapted to receive said file path and scan the selected process associated with the file path using the virus signature database; and an iteration means adapted to invoke said selection means until each of said plurality of running processes are scanned.

13. The system for protecting devices as claimed in claim 12, wherein said file path is in a MS DOS path format.

14. The system for protecting devices as claimed in claim 12, wherein said retrieving means is the GetMappedFileName function.

15. A 64-bit module running on 64-bit operating system including said retrieving means as claimed in claim 14.

16. A method for protecting devices against virus attacks, the devices including a 64-bit operating system and a virus signature database, a plurality of processes and a plurality of user interfaces, said method comprising the following steps:
creating a list of at least one running process in the device to be scanned;
listing the Process Identifiers associated with each process in said list;
selecting one of said Process Identifiers associated with one of said running processes;
opening said selected processes using a handle;
retrieving and defining an actual file path from said handle of said selected process, wherein the actual file path is defined as a file path from which a file is actually running instead of a file path which was originally used to run the process;
converting said retrieved and defined file path from a first pre-defined format to a second pre-defined format; and
receiving said file path and scanning said selected process associated with said file path using the virus signature database.

17. The method for providing a system for protecting devices as claimed in claim 16 wherein said step of selecting one of said Process Identifiers associated with one of said running processes is iterated until each of said plurality of Process Identifiers has been selected at least once.

18. The method for providing a system for protecting devices as claimed in claim 16 wherein said step of retrieving and defining an actual file path includes using the GetMappedFileName function.

19. A method of operation in a 64-bit module running on 64-bit operating system including the step of retrieving and defining an actual file path as claimed in claim 18.

20. The method for providing a system for protecting devices as claimed in claim 16 wherein said step of receiving said file path includes receiving said file path in MS DOS path format.

* * * * *